(12) United States Patent
Wallace et al.

(10) Patent No.: US 8,745,278 B2
(45) Date of Patent: Jun. 3, 2014

(54) FIELD DEVICE WITH SELF DESCRIPTION

(75) Inventors: Thomas Charles Wallace, Lakeville, MN (US); Marcos Peluso, Chanhassen, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 12/903,500

(22) Filed: Oct. 13, 2010

(65) Prior Publication Data

US 2012/0093242 A1    Apr. 19, 2012

(51) Int. Cl.
*G06F 3/00* (2006.01)

(52) U.S. Cl.
USPC ......... 710/8; 710/10; 710/72; 713/2; 717/168

(58) Field of Classification Search
None
See application file for complete search history.

(56) References Cited

U.S. PATENT DOCUMENTS

| | | | | |
|---|---|---|---|---|
| 5,764,891 | A | * | 6/1998 | Warrior ........................... 710/72 |
| 5,796,602 | A | * | 8/1998 | Wellan et al. ...................... 700/1 |
| 5,819,108 | A | * | 10/1998 | Hsu et al. ......................... 710/10 |
| 6,055,633 | A | * | 4/2000 | Schrier et al. .................. 713/100 |
| 6,298,069 | B1 | * | 10/2001 | Prabhu et al. .................. 370/463 |
| 6,424,872 | B1 | | 7/2002 | Glanzer et al. .................. 700/18 |
| 6,854,055 | B1 | * | 2/2005 | Stinus et al. .................. 713/100 |
| 6,889,166 | B2 | | 5/2005 | Zielinski et al. ............... 702/183 |
| 6,904,476 | B2 | | 6/2005 | Hedtke ........................... 710/72 |
| 7,299,348 | B2 | * | 11/2007 | Stinus et al. ....................... 713/2 |
| RE40,817 | E | | 6/2009 | Krivoshein et al. ................ 700/1 |
| 7,865,907 | B2 | | 1/2011 | Opheim ......................... 719/321 |
| 7,873,956 | B2 | * | 1/2011 | Kim et al. ...................... 717/168 |
| 7,889,747 | B2 | * | 2/2011 | Hodson et al. ................. 370/401 |
| 8,250,242 | B2 | * | 8/2012 | Furusawa ........................... 710/5 |
| 8,266,602 | B2 | * | 9/2012 | Hodson et al. ................. 717/137 |
| 2003/0204373 | A1 | | 10/2003 | Zielinski et al. ............... 702/184 |
| 2003/0229472 | A1 | * | 12/2003 | Kantzes et al. ................. 702/183 |
| 2003/0229473 | A1 | * | 12/2003 | Gomes et al. .................. 702/187 |
| 2004/0015952 | A1 | * | 1/2004 | Lajoie et al. ................... 717/171 |
| 2004/0125782 | A1 | * | 7/2004 | Chang ........................... 370/338 |
| 2004/0143828 | A1 | * | 7/2004 | Liu et al. ........................ 717/168 |
| 2005/0071851 | A1 | * | 3/2005 | Opheim ......................... 719/321 |

(Continued)

FOREIGN PATENT DOCUMENTS

CN     ON 1273647 A    11/2000
CN        1804744 A     7/2006

(Continued)

OTHER PUBLICATIONS

'Technical Information—Foundation Fieldbus' by Samson, last updated at www.samson.de on Jun. 23, 2007.*

(Continued)

*Primary Examiner* — Steven Snyder
(74) *Attorney, Agent, or Firm* — Westman, Champlin & Koehler, P.A.

(57) ABSTRACT

A field device having a self-description is provided. The field device includes loop communication circuitry configured to communicate process information using a process standard communication protocol. A controller is coupled to the loop communication circuitry to communicate with one or more process devices using the loop communication circuitry. The controller is coupled to a non-volatile, writeable, non-transitory computer readable medium having a plurality of blocks. A first block contains device executable code, which when executed by the controller causes the field device to provide at least one process control function. A second block, at least as large as the first block, contains an electronic device description of the field device.

6 Claims, 7 Drawing Sheets

(56) References Cited

U.S. PATENT DOCUMENTS

| | | | |
|---|---|---|---|
| 2005/0114086 A1 | 5/2005 | Zielinski et al. | 702/184 |
| 2005/0164684 A1 | 7/2005 | Chen et al. | |
| 2005/0278461 A1* | 12/2005 | Ohta | 710/8 |
| 2006/0117170 A1* | 6/2006 | Cheng | 713/2 |
| 2007/0067725 A1* | 3/2007 | Cahill et al. | 715/733 |
| 2008/0091376 A1* | 4/2008 | Russell et al. | 702/107 |
| 2008/0112388 A1 | 5/2008 | Garrett et al. | 370/351 |
| 2008/0125884 A1* | 5/2008 | Schumacher et al. | 700/79 |
| 2008/0133546 A1* | 6/2008 | Phillips | 707/10 |
| 2008/0288933 A1* | 11/2008 | Budmiger et al. | 717/168 |
| 2009/0222594 A1* | 9/2009 | Schwabe et al. | 710/15 |
| 2010/0281110 A1* | 11/2010 | Phillips | 709/203 |
| 2011/0125295 A1* | 5/2011 | Bednasch et al. | 700/83 |
| 2012/0065748 A1 | 3/2012 | Nixon et al. | |
| 2012/0078386 A1* | 3/2012 | Holmes et al. | 700/17 |

FOREIGN PATENT DOCUMENTS

| | | |
|---|---|---|
| CN | 202306262 U | 7/2012 |
| JP | 11-143506 | 5/1999 |
| JP | 2001203775 | 7/2001 |
| JP | 2003295943 A | 10/2003 |
| JP | 2006099219 A | 4/2006 |
| JP | 2006252145 A | 9/2006 |
| JP | 2009048289 A | 3/2009 |
| JP | 2009-205243 | 9/2009 |
| JP | 2010-505185 | 2/2010 |
| JP | 2010211443 A | 9/2010 |
| WO | WO 9919782 A1 | 4/1999 |
| WO | WO 2009/074544 | 6/2009 |

OTHER PUBLICATIONS

Jonas Berge's article on 'Electronic Device Description Language (EDDL) for efficiency' from Hydrocarbon Asia, Mar.-Apr. 2008.*
Berge, J., EDDL: Unlocking Device Information, Control Engineering Asia, Sep. 2007.
Notification of Transmittal of the International Search Report and the Written Opinion from the International application No. PCT/US2011/055545 dated Jan. 31, 2012.
First Chinese Office Action dated Dec. 12, 2013 for Chinese patent appln. No. 201110260381.3, 18 pgs including English translation.
Notification of Reasons for Rejection in related Japanese Patent Application No. 2013-533903 dated Mar. 18, 2014. 5 pgs including English translation.

* cited by examiner

FIELD DEVICE WITH SELF DESCRIPTION

BACKGROUND

Field devices are used in a variety of process plants, such as chemical refinery plants and pharmaceutical manufacturing plants, to measure, monitor, and control parameters of the process. A field device may be a control device, such as a valve controller or actuator, a process variable transmitter, such as a process pressure transmitter, et cetera or any other device that may affect or be affected by a value associated with the process.

Many field devices are so-called "smart" field devices in that they are capable of digital communication and typically include a microprocessor or other suitable processing circuitry. Smart field devices store and digitally transmit detailed information that may be specific to the field device itself, including calibration, diagnostic information, maintenance information, configuration information, et cetera. All of this information can be transmitted in addition to the process information. Some field devices may store and transmit the units in which the device is measuring, an indication regarding whether the device is operating properly, the maximum and minimum measurement ranges of the device, diagnostic information, et cetera. In fact, many smart field devices are able to perform operations on themselves, such as self diagnostics and/or self calibration. Smart field devices typically communicate digitally in accordance with a process standard communication protocol. Examples of such protocols include the Highway Addressable Remote Transducer (HART®) protocol, the FOUNDATION™ Fieldbus protocol, and others.

Communication with a specific smart field device is generally performed in accordance with the device's communication protocol. Some process standard communication protocols, such as FOUNDATION™ Fieldbus and HART®, use a device description (DD) that is written in accordance with a device description language. A device description language (DDL) is a human-readable language that provides a protocol for describing the capabilities of a smart field device, such as the data available from the field device, the meaning of the data associated with and retrieved from the smart field device, as well as methods or procedures that can be used with the smart field device. The format for communicating with the field device to obtain data and user interface information is also generally set forth in the device description.

A device description (DD) is a file written in accordance with a communication protocol or a particular DDL which specifies all the information available regarding a specific smart field device. Device descriptions for smart field devices typically specify five categories of information including: 1) identification of the parameters and/or properties associated with the device, including the types of data defining the parameters and/or properties (such as whether the parameters and/or properties are variables, arrays, or records and the units associated with each); 2) commands necessary for communication with the field device including information regarding how to send messages to and receive messages from the field device; 3) user interface data such as menus and displays which logically group parameter and/or property-related data; 4) methods or procedures to be run by a host device in relation to the smart field device, such methods may include providing information to a user in the form of instructions and/or sending messages to the smart field device to implement, for example, a diagnostic or calibration routine on the field device; and 5) utility information such as device-description writer-defined groupings of parameter or properties to be used in connection with the parameter, command, user interface, and method information.

In order to develop a device description source file for a smart field device, a developer or manufacturer typically uses the device description language for the communication protocol associated with that field device to describe core or essential characteristics of the field device. Additionally, the developer may provide group-specific and/or vendor-specific definitions relative to functions and special features of the field device. The developed device description source file is then compiled into a machine-readable device description object file using, for example, a tokenizer. Device description object files are typically provided to a user by the device manufacturer or a third-party developer to be stored in a host system such as a field device management system or a hand-held field maintenance tool. The host system uses the device description object file for a smart field device to decode and define a complete description of the interface with the smart field device.

Some smart field devices, such as FOUNDATION™ Fieldbus devices which may include temperature, pressure, level, and flow instruments as well as final control elements including, but not limited to, valves use a technology known as "electronic device description" to provide host systems such as a distributed control system, programmable logic controller, or asset management software located in both fixed and portable platforms with information on the full capabilities of the smart field device and the ways in which the field device and those capabilities may be accessed. Loss or failure of a smart field device can have severe consequences on the process including reduced quality, loss of production, unintended emissions, and/or compromised safety for plant personnel.

Manufacturers of smart field devices sometimes issue new revisions of device hardware and/or software to correct problems or enhance functionality. These new revisions sometimes require a different electronic device description to describe the device capabilities and the manner in which those capabilities may be accessed. Although the device is revised, the device model numbers generally do not change. Thus, an end user may have several devices with the same model number but with different revision levels. To access and use device functionality, an electronic device description appropriate for each specific device revision must be installed on the host.

Traditionally, electronic device descriptions can be obtained from several sources including vendor websites and foundations, such as the Fieldbus foundation. These electronic device descriptions are sometimes shipped with the field devices on a CD or other computer-readable media. If the user of the field device is not aware that a specific device has had a revision and that a new electronic device description is needed to access and use device functionality, the user may fail to obtain and install the appropriate electronic device description on the host system. If this happens, the user may find that a smart field device cannot be set up, commissioned, configured, or otherwise initiated. Field devices are frequently located in remote locations such as offshore drilling platforms and other locations where internet access is not available. This prevents the user from easily obtaining electronic device descriptions from traditional sources such as a vendor or internet website. This can result in a number of undesirable consequences.

SUMMARY

A field device having a self-description is provided. The field device includes loop communication circuitry configured to communicate process information using a process standard communication protocol. A controller is coupled to the loop communication circuitry to communicate with one or more process devices using the loop communication circuitry. The controller is coupled to a non-volatile, writeable, non-transitory computer readable medium having a plurality of blocks. A first block contains device executable code, which when executed by the controller causes the field device to provide at least one process control function. A second block, at least as large as the first block, contains an electronic device description of the field device.

DETAILED DESCRIPTION OF ILLUSTRATIVE EMBODIMENTS

Figure 1:
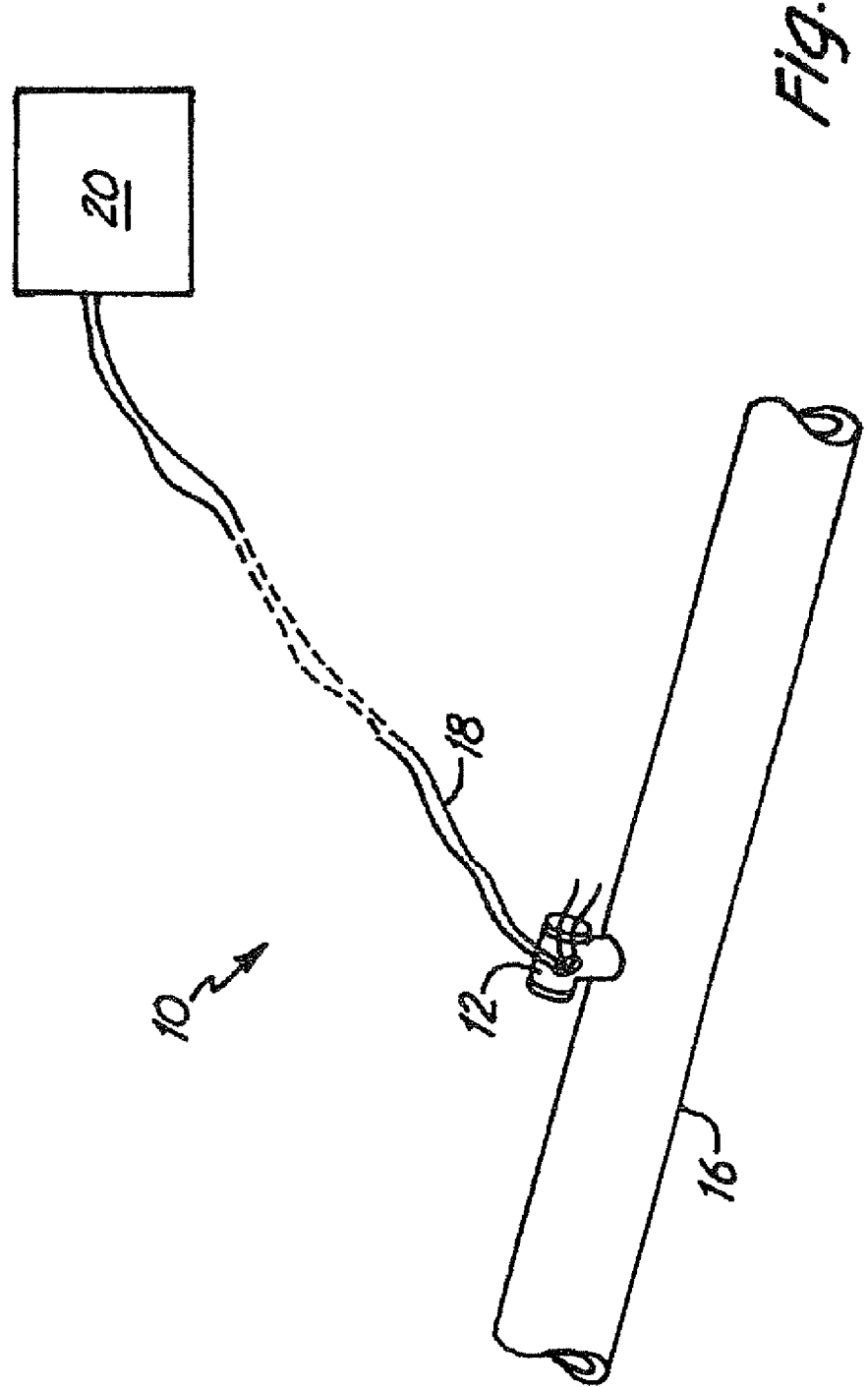
FIG. 1 is a diagrammatic view of a process control system including a field device in accordance with an embodiment of the present invention.

As set forth above, it is sometimes difficult for a user to obtain the correct device description to interact with a specific smart field device. Device revisions sometimes change. This means that the user may have two seemingly identical field devices, but the devices may require two different device descriptions and one may not work if the user tries to use it. Without the correct device description, the device cannot be commissioned or configured. The current method of dealing with this situation is to have the customer download the device description from a suitable resource, such as the FOUNDATION™ Fieldbus website. The user is often not in the position to be able to do that or the situation may be time critical, and the delay needed to download the correct device description from the internet could result in a shutdown or other negative user consequence. This situation is sometimes viewed as a device problem and manufacturers spend significant resources to address it.

In accordance with various embodiments of the present invention, a writeable portion of non-volatile memory within the field device is used to store the correct device description for that field device. This writeable portion of non-volatile memory is often left empty to accommodate potential firmware downloads. For example, FOUNDATION™ Fieldbus devices typically have writeable non-volatile memory (generally in the form of flash memory) divided into two blocks. One block contains all of the device-executable code and setup, configuration, and commission information. This block also contains the real-time operating information. The second block of writeable non-volatile memory is generally kept empty. This memory is designed into the device such that the device can be updated with new device-executable code while continuing to operate using the original executable code during the update process. With respect to FOUNDATION™ Fieldbus devices, this capability is required in the standard.

Updating the device with the new executable code is a known process. Typically, the new device-executable code is downloaded to the device into the second block of writeable non-volatile memory. The field device continues to operate using the executable code and other information contained in the first writeable non-volatile memory block. Once the download of the new executable code is complete and has been verified as correct, the smart field device switches from using the original executable code in the first block of memory to using the updated executable code in the second block of memory. This design means that devices, such as smart FOUNDATION™ Fieldbus devices, generally have twice the physical, writeable, non-volatile memory need to write the executable code, and half of the writeable, non-volatile memory is generally unused. In accordance with an embodiment of the present invention, this essentially empty memory in the second block is used to store the correct device description for the field device. The correct device description for the smart field device can be loaded into the device at manufacturing and a simple utility can be provided to upload the device description into a personal computer or handheld field maintenance tool, thereby ensuring that the user will always have the correct device description for the device. Further, since the memory capacity already exists in these smart field devices, there is no additional hardware cost to practice embodiments of the present invention.

FIG. 1 is a diagrammatic view of a process control system which includes a smart field device 12 connected to a process pipe 16. Field device 12 is coupled to a process communication loop 18 which operates in accordance with a process industry communication standard, such as the FOUNDATION™ Fieldbus standard or HART® standard. Process control loop 18 runs between smart field device 12 and control room 20. The HART® protocol allows a digital signal to be superimposed on an analog current through loop 18 such that digital information can be sent to or received from smart field device 12. When operating in accordance with FOUNDATION™ Fieldbus standard, loop 18 carries a digital signal and can be coupled to multiple smart field devices.

Field devices are generally characterized by their robust ability to operate in an outdoor environment for extended periods of time. Usually, field devices have a field-hardened enclosure so that they can be installed outdoors in relatively rugged environments and are able to withstand climatological extremes of temperature, humidity, vibration, mechanical shock, et cetera. These devices can typically operate on relatively low power. For example, some field devices are currently available that receive all of their operating power from a known 4-20 mA loop.

Figure 2:
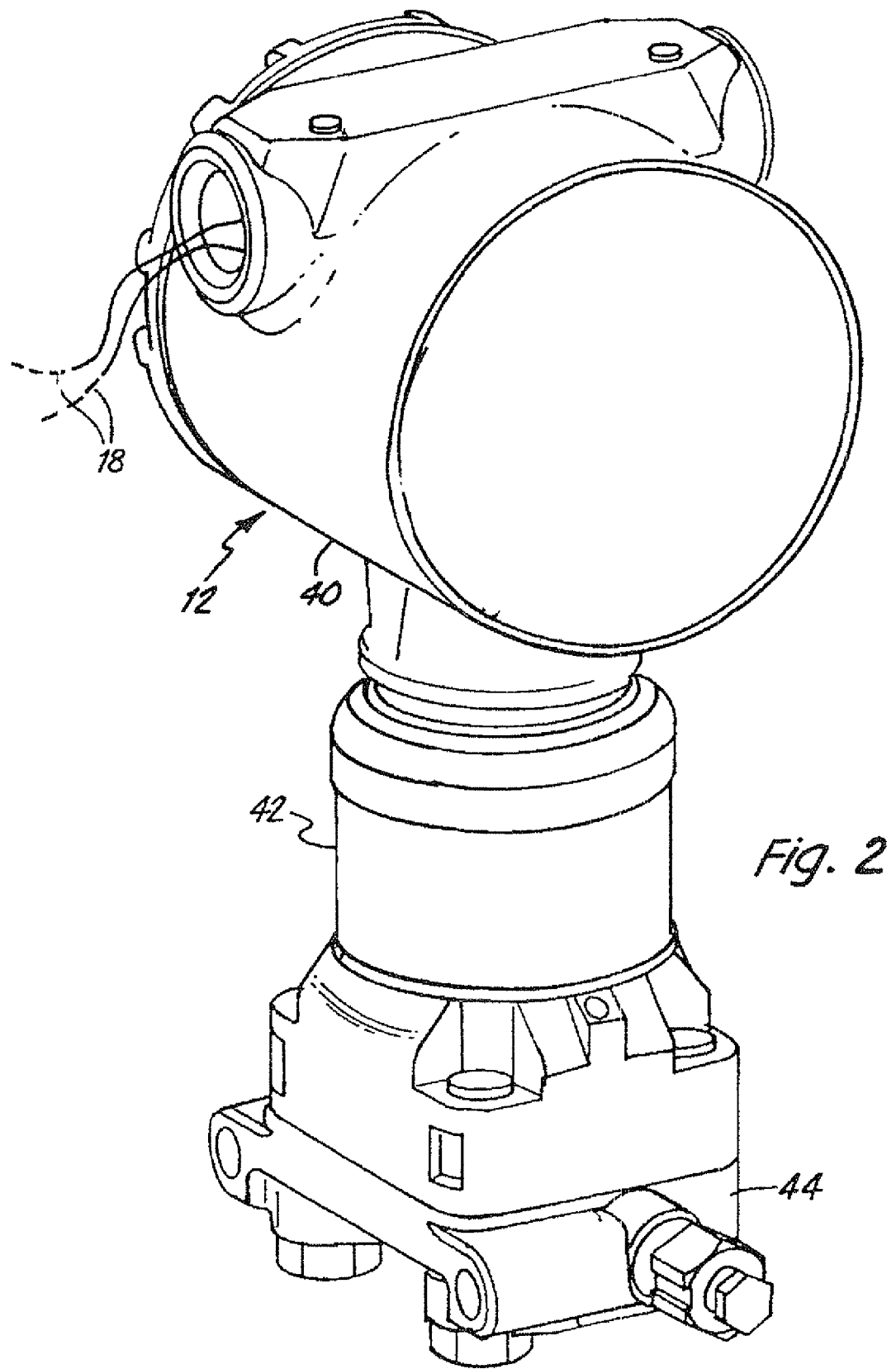
FIG. 2 is a perspective view of a field device shown in FIG. 1 in accordance with an embodiment of the present invention.

FIG. 2 is a perspective diagram of smart field device 12 having a manifold process coupling 44 coupled to a sensor module 42 that contains a sensor, such as a pressure sensor, that senses a parameter of the process fluid. Electronics disposed within electronics enclosure 40 measure an electrical characteristic of the sensor and provide communication to other devices over process communication loop 18.

Figure 3:
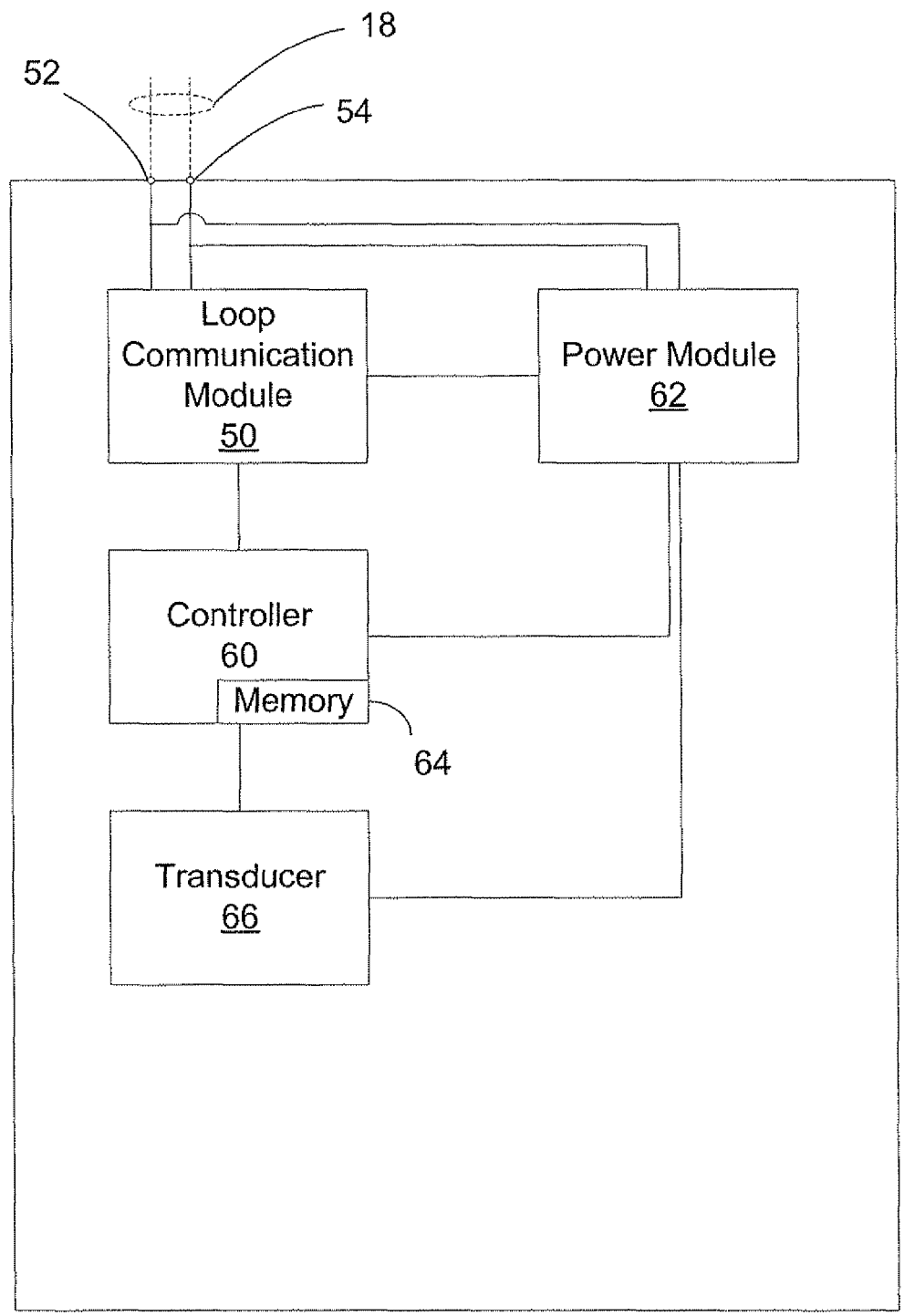
FIG. 3 is a block diagram of a field device in accordance with an embodiment of the present invention.

FIG. 3 is a system block diagram of smart field device 12 in accordance with an embodiment of the present invention. Smart field device 12 includes loop communication module 50 which is illustrated, in this embodiment, as being coupleable to process communication loop 18 via terminals 52, 54. Loop communication module 50 is coupled to controller 60 such that information from controller 60 can be transformed into physical signals appropriate for communication upon process communication loop 18. For example, loop communication module 50 may be configured to generate signals in accordance with the HART® communication protocol. In another embodiment, loop communication module 50 may be configured to generate signals in accordance with the FOUNDATION™ Fieldbus protocol. In still other embodiments, loop communication module 50 may not be coupled directly to any wired connections whatsoever, but instead coupled to an antenna and configured to generate wireless process communication signals in accordance with a wireless process communication protocol. A suitable example of a wireless process communication protocol is the wireless HART standard published by the HART® Communication Foundation in September 2007. Relevant portions of the WirelessHART specification include: HCF_Spec 13, revision 7.0; HART Specification 65—Wireless Physical Layer Specification; HART Specification 75—TDMA Data Link Layer Specification (TDMA refers to Time Division Multiple Access); HART Specification 85—Network Management Specification; HART Specification 155—Wireless Command Specification; and HART Specification 290—Wireless Devices Specification.

Smart field device 12 also includes power module 62 that, in the illustrated embodiment, is coupled to terminals 52 in order to allow field device 12 to operate on power received through terminals 52 and 54. In embodiments where smart field device 12 is not coupled to a wired process communication loop, power module 62 may simply be a battery, rechargeable or otherwise, or a supercapacitor. Further, embodiments of power module 62 can include known techniques for harvesting or otherwise scavenging electrical power available from the environment proximate smart field device 12.

Controller 60 is preferably a microprocessor that includes, or is coupled to, writeable non-volatile memory 64. Memory 64 is a non-transitory computer-readable medium and will be described in greater detail with respect to FIG. 4.

Field device 12 also includes, or is coupled to, transducer 66 which may be a sensor or actuator. In embodiments where transducer 66 is a sensor, the field device may sense a process variable, such temperature, pressure, flow, or any other suitable process variable, and provide an indication thereof via loop communication module 50. In embodiments where transducer 66 is an actuator, field device 12 may be a digital valve controller that receives information via loop communication module 50 and physically sets a variable, such as valve closure, based upon information received.

Figure 4:
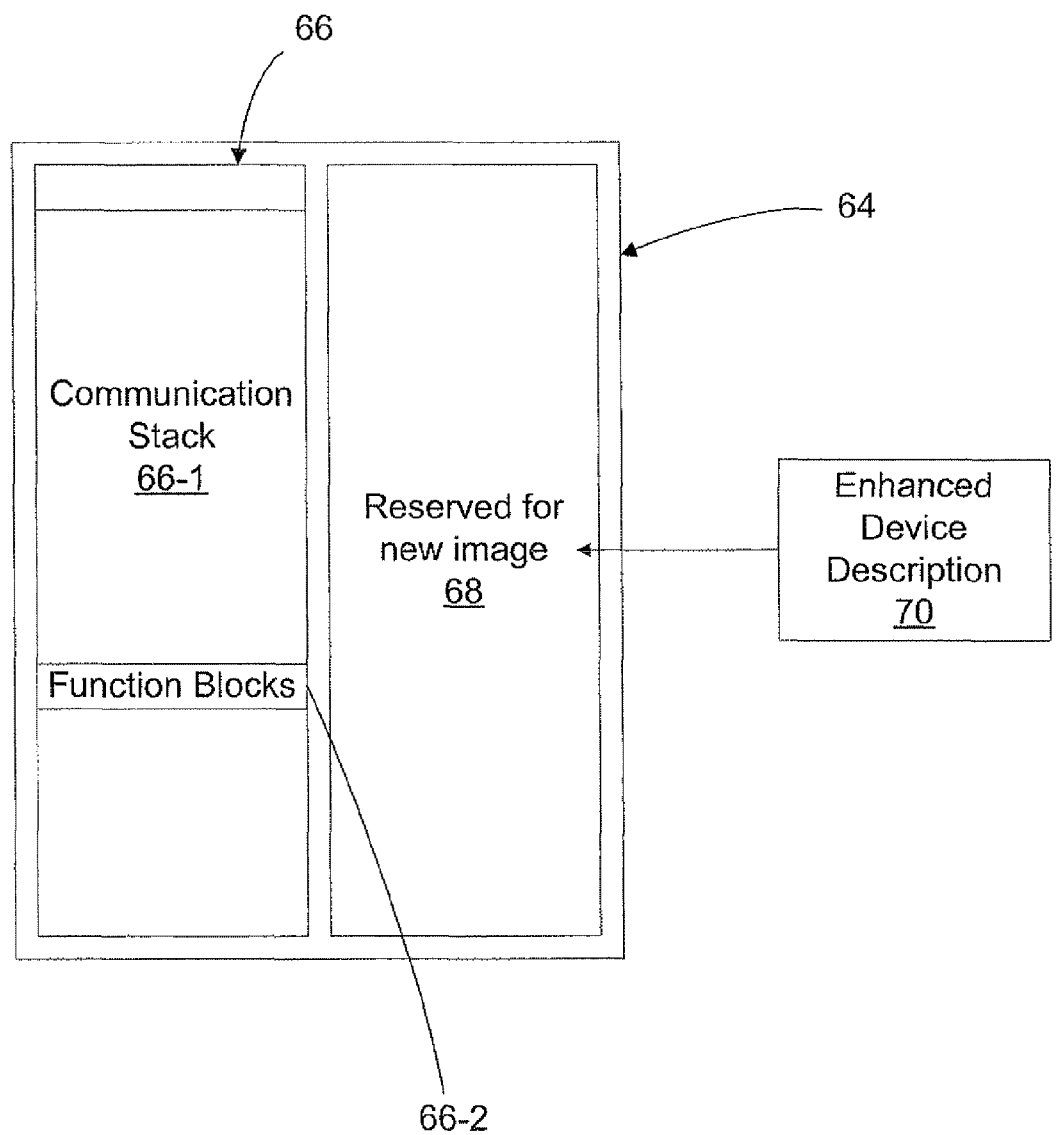
FIG. 4 is a diagrammatic view of multiple memory blocks embodied within a field device in accordance with an embodiment of the present invention.

FIG. 4 is a diagrammatic view of memory unit 64 in accordance with an embodiment of the present invention. Memory unit 64 is preferably embodied upon electrically erasable and rewriteable non-volatile memory. A preferred example of this type of memory is flash memory. Memory unit 64 includes first block 66 and second block 68, which is at least as large as first block 66. Within first block 66, a communication stack is provided at reference numeral 66-1 and function blocks are provided as indicated at reference numeral 66-2. The portion within second block 68 is reserved for a new software image that is used to update the field device with new device-executable code in order to update, improve, or otherwise remedy operation of the field device. Once the download of new executable code into portion 68 is complete and has been verified by the field device or other suitable device as being correct, the field device switches from using the original executable code in first block 66 to using the updated executable code in block 68.

As indicated in FIG. 4, a device description 70 is provided by the device manufacturer or other suitable device provider and stored in block 68 which is traditionally reserved for the new image. Additionally, controller 60 is configured through software, hardware, or a combination thereof, to receive requests for the device description 70 stored in block 68, and provide that device description to the requesting device. Additionally, smart field device 12, by virtue of controller 60, still allows an unfettered ability to upgrade the device-executable code by automatically allowing the updated code to overwrite the device description residing in portion 68. This serves, at least, a couple of purposes. First, the ease with which the entire field device-executable code may be upgraded is maintained. Second, since the upgraded device-executable code may include new or different features, the device description file resident in portion 68 is automatically obsolete as soon as the new device-executable code begins overwriting it.

Figure 5:
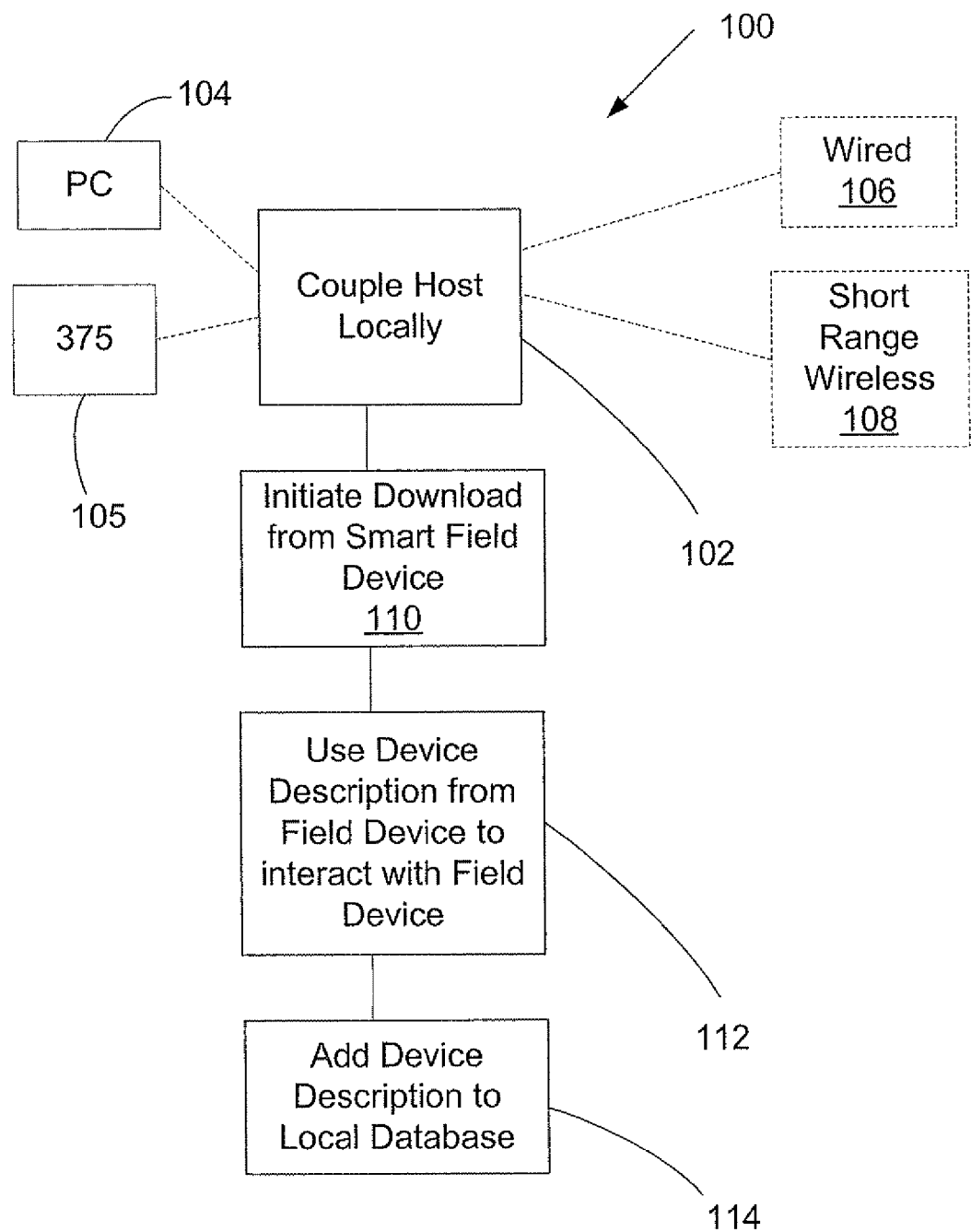
FIG. 5 is a flow diagram of a method of downloading a device description relative to a field device from the field device in accordance with an embodiment of the present invention.

FIG. 5 is a flow diagram of a method of obtaining a device description from a field device in accordance with an embodiment of the present invention. Method 100 begins at block 102 where a handheld configuration tool, such as the Model 375 Communicator available from Fisher-Rosemount Systems, Inc. of Austin, Tex., is coupled locally proximate the smart field device as indicated at block 105. Additionally, the local coupling can be done with a personal computer, as appropriate, as indicated at reference numeral 104. The local coupling can be performed via a wired connection, such as via the wiring terminals of the Model 375 Communicator or via another suitable wired connection, as indicated at reference numeral 106. Further, the local coupling can be performed using short range wireless communication as indicated at block 108. Suitable examples of short range wireless communication include Wi-Fi in accordance with IEEE 802.11 (b), and/or the known Bluetooth protocol. Once the smart field device is communicatively coupled to the local computing device (Handheld Communicator 375 or personal computer), the device description of the field device is downloaded via the communication link from the field device to the computing device, as indicated at block 110. Subsequently, at block 112, the device description received from the field device can be parsed or otherwise processed to provide the technician using the local computing device or handheld communicator, to interact with the field device in a manner that is specific to the unique capabilities and specifications of the field device, as illustrated at block 112. Preferably, method 100 continues at block 114 where the device description received from the field device and resident within the personal computer or handheld communicator is added to a local database of device descriptions resident upon the personal computer or handheld communicator. Accordingly, a technician arriving at the field device and not having a device description relative to that field device is nonetheless able to obtain the device description from the device and interact in a device-specific manner with the device having no a priori device-specific information.

Figure 6:
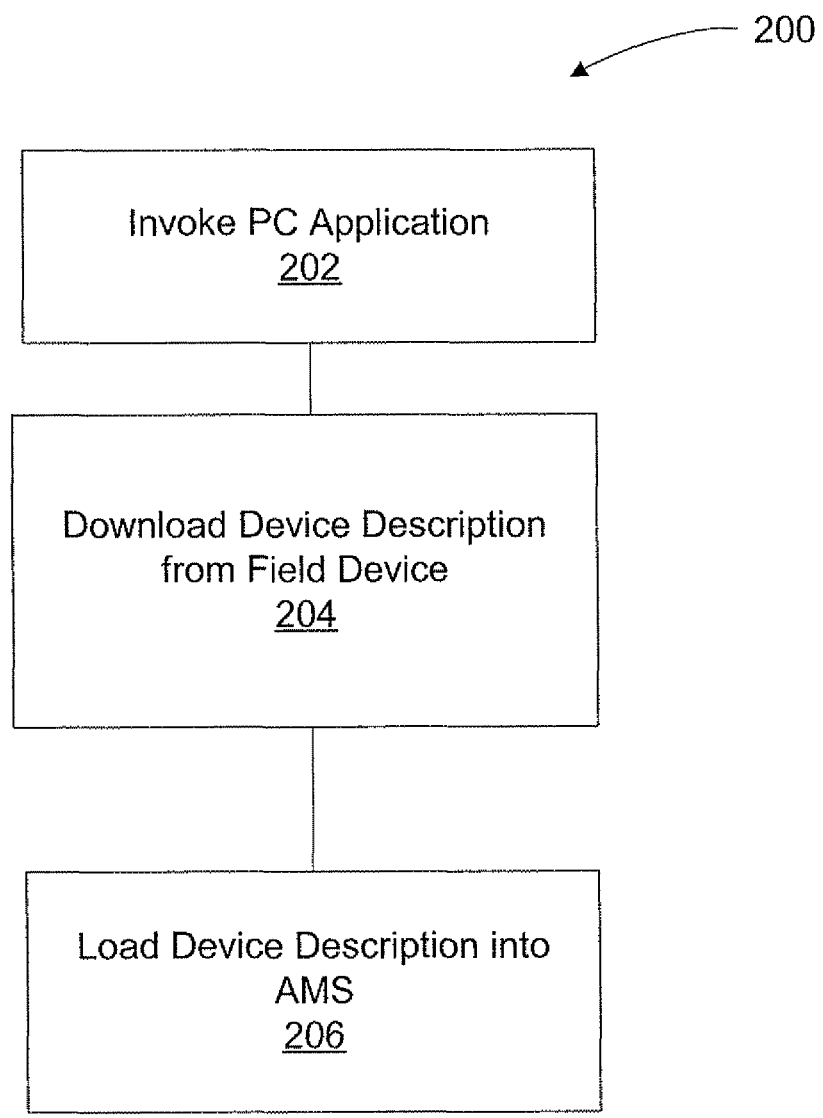
FIG. 6 is a flow diagram of a method of downloading a device description from a smart field device to a personal computer in accordance with an embodiment of the present invention.

FIG. 6 is a flow diagram of another method of downloading a device description from a smart field device in accordance with an embodiment of the present invention. Method 200 begins at block 202 where a PC-resident utility or software application is invoked. Upon invocation of the utility, the utility causes the personal computer to communicate through a process communication loop (coupled to the personal computer) with the field device. This communication allows the PC-resident utility to download the device description from the field device as indicated at block 204. Once the utility has downloaded the device description from the smart field device as illustrated at block 204, the downloaded device description file is then loaded into an asset management system and/or distributed control system and/or any suitable other system used for control, monitoring and/or data acquisition. This allows the computer and other suitable devices coupled thereto to have device-specific interactions with the smart field device.

Figure 7:
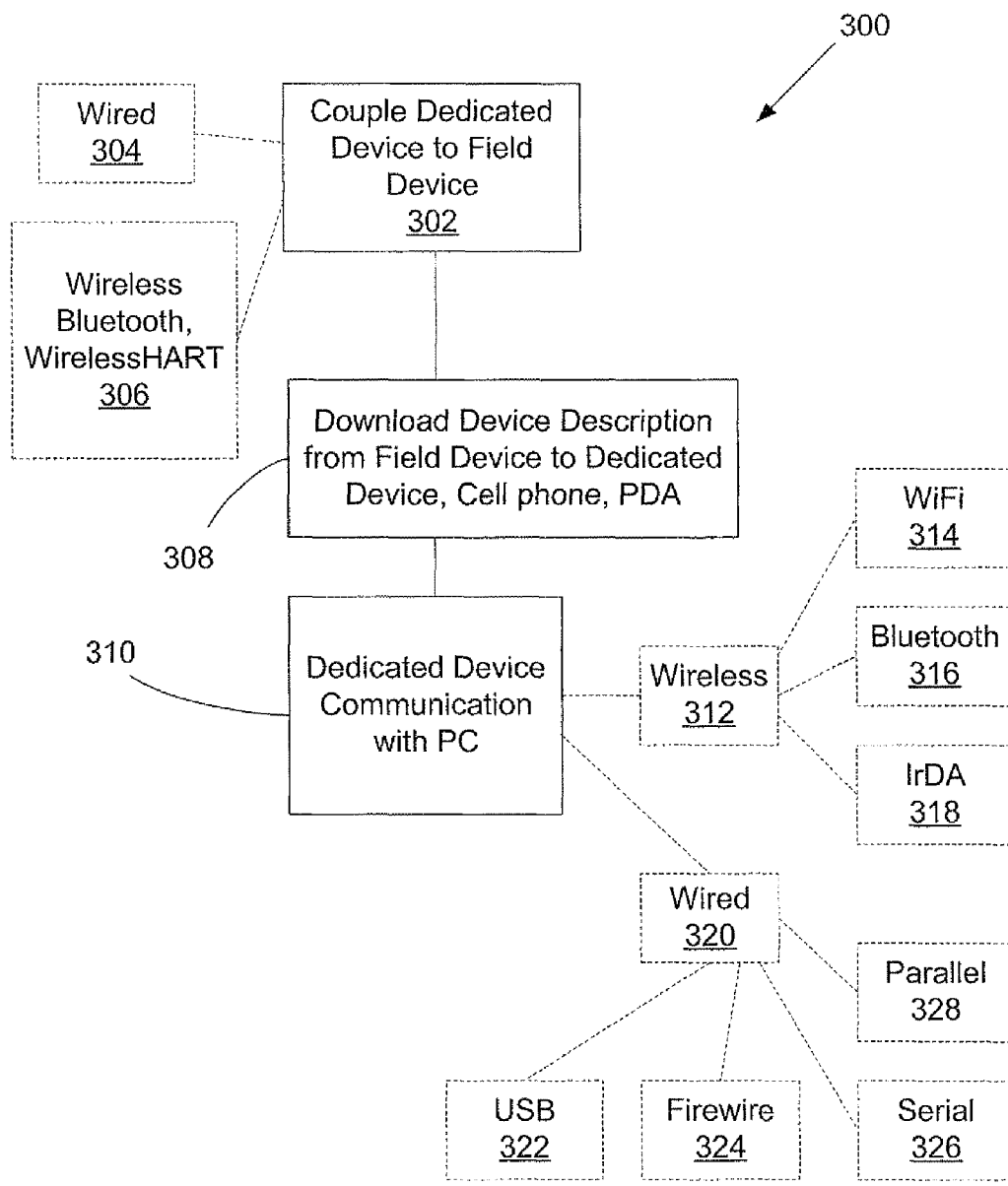
FIG. 7 is a flow diagram of a method of downloading a device description from a field device to a portable device in accordance with an embodiment of the present invention.

FIG. 7 is a flow diagram of another method of downloading a device description from a smart field device in accordance with an embodiment of the present invention. Method 300 begins at block 302 where a dedicated device, suitable cell phone, or personal digital assistant (PDA) is communicatively coupled to the field device. This communicative coupling can be performed using a wired connection 304 or a wireless connection 306. Suitable examples of wireless communication include the known Bluetooth specification as well as WirelessHART® communication (in the instance of a dedicated device). As used herein, the dedicated device is a device that is specifically designed to communicatively couple to smart field devices and obtain device descriptions thereof. The dedicated device is also configured to provide the device description to another suitable host, such as a handheld field maintenance tool or personal computer, through known means. Once the dedicated device, cell phone, or PDA is coupled to the field device, block 308 executes where the field device uploads the device description to the suitable device. Thereafter, block 310 executes where the dedicated device, cell phone, or PDA is coupled to a suitable host, such as a handheld field maintenance tool or personal computer. The coupling between the dedicated device, cell phone, or PDA and the personal computer can be the via a wireless coupling 312 such as Wi-Fi 314, Bluetooth 316, or infrared communication 318. Additionally, or alternatively, the communication between the dedicated device, cell phone, or PDA and the personal computer can be via a wired coupling 320. Examples of wired couplings include couplings using the Universal Serial Bus 322, the known Firewire specification 324, serial communication such as RS-232 communication 326, and/or parallel communication such as via the parallel port of the personal computer 328. Regardless of the type of coupling, the coupling itself allows the dedicated device, cell phone, or PDA to upload the device description received from the field device into a suitable asset management System such that the asset management system and devices coupled thereto can interact with the field device in a device-specific manner.

Embodiments of the present invention generally provide a number of advantages to users of field devices and technicians. Specifically, the correct electronic device description for the specific smart field device and the device revision is included within the device flash memory when the device is shipped from the factory. This means that the correct electronic device description is always available for initial setup, configuration, and commissioning of the device. Further, since the electronic device description is stored in writeable, non-volatile memory that is already designed and manufactured into the device, there is no incremental cost of goods sold to implement this capability.

Although the present invention has been described with reference to preferred embodiments, workers skilled in the art will recognize that changes may be made in form and detail without departing from the spirit and scope of the invention.

What is claimed is:

1. A method of obtaining a device description relative to a field device, the method comprising:
   providing the field device with a plurality of blocks of non-volatile, writeable, non-transitory computer readable memory, a first block containing device executable code, and a second block, at least as large as the first block;
   loading an electronic device description object file into the second block during manufacture of the field device;
   physically accessing the field device;
   locally coupling a host to the field device;
   downloading the device description object file from the second block of memory to the host;
   using the electronic device description object file to subsequently interact with the field device in a device-specific manner; and
   accepting a writing of updated device executable code into the second block, the updated device executable code overwriting the electronic device description object file.

2. The method of claim 1, wherein the host is a handheld communicator.

3. The method of claim 1 wherein the host is a personal computer (PC).

4. The method of claim 1, wherein the host is a personal digital assistant.

5. The method of claim 1, wherein the host is a cell phone.

6. A method of obtaining a device description loaded into a field device during manufacture of the field device, the method comprising:
   providing the field device with a plurality of blocks of non-volatile, writeable, non-transitory computer readable memory, a first block containing device executable code, and a second block, at least as large as the first block;
   loading an electronic device description object file into the second block during manufacture of the field device;
   invoking a software application on a personal computer that is communicatively coupled to a process communication loop;
   downloading the device description with the software application from the second block of memory in the field device to the personal computer through the process communication loop;
   using the device description to subsequently interact with the field device in a device-specific manner; and
   accepting a writing of updated device executable code into the second block, the updated device executable code overwriting the electronic device description object file.

* * * * *